(12) United States Patent
Lee et al.

(10) Patent No.: US 10,429,678 B2
(45) Date of Patent: Oct. 1, 2019

(54) PANEL REVERSING APPARATUS, AND SYSTEM AND METHOD OF MANUFACTURING OPTICAL DISPLAY ELEMENT

(71) Applicant: LG CHEM, LTD., Seoul (KR)

(72) Inventors: Beom Seok Lee, Daejeon (KR); Suk Jae Lee, Daejeon (KR); Kyung Hyeok Park, Daejeon (KR); San Park, Daejeon (KR); Hang Suk Choi, Daejeon (KR); Eung Jin Jang, Daejeon (KR); Bong Su Jeung, Daejeon (KR); Jea Han Ryoo, Daejeon (KR)

(73) Assignee: LG CHEM, LTD., Seoul (KR)

(*) Notice: Subject to any disclaimer, the term of this patent is extended or adjusted under 35 U.S.C. 154(b) by 235 days.

(21) Appl. No.: 15/619,817

(22) Filed: Jun. 12, 2017

(65) Prior Publication Data
US 2017/0363886 A1  Dec. 21, 2017

(30) Foreign Application Priority Data
Jun. 20, 2016 (KR) .................. 10-2016-0076576

(51) Int. Cl.
*G02F 1/13* (2006.01)
*B32B 38/00* (2006.01)
(Continued)

(52) U.S. Cl.
CPC ........ *G02F 1/1303* (2013.01); *B32B 37/0046* (2013.01); *B32B 38/0004* (2013.01); *B32B 38/10* (2013.01); *G02F 1/1309* (2013.01); *G02F 1/133528* (2013.01); *B32B 2551/00* (2013.01); *G02F 2001/133302* (2013.01);
(Continued)

(58) Field of Classification Search
CPC .................................................... G02F 1/1303
See application file for complete search history.

(56) References Cited

U.S. PATENT DOCUMENTS

2003/0045219 A1  3/2003  Yang et al.
2012/0080145 A1  4/2012  Hirata et al.
(Continued)

FOREIGN PATENT DOCUMENTS

CN    102445784 A    5/2012
CN    103770429 A    5/2014
(Continued)

OTHER PUBLICATIONS

Machine Translation of Japanese Patent 2006-310697, Date Unknown.*
(Continued)

*Primary Examiner* — Jeffry H Aftergut
(74) *Attorney, Agent, or Firm* — Dentons US LLP

(57) ABSTRACT

Disclosed is a panel reversing apparatus which reverses a panel, the panel reversing apparatus including: a panel support unit which supports the panel; and a rotating unit which rotates the panel support unit so as to reverse a direction, in which one surface of the panel supported by the panel support unit faces, and a direction, in which the other surface of the panel faces, in which the panel support unit includes a single surface contact unit which is in contact with only one surface between the one surface and the other surface of the panel.

12 Claims, 6 Drawing Sheets

(51) Int. Cl.
 *B32B 38/10* (2006.01)
 *G02F 1/1335* (2006.01)
 *B32B 37/00* (2006.01)
 *G02F 1/1333* (2006.01)
(52) U.S. Cl.
 CPC ............ *G02F 2001/133531* (2013.01); *G02F 2001/133538* (2013.01)

(56) References Cited

U.S. PATENT DOCUMENTS

| | | | | |
|---|---|---|---|---|
| 2012/0300377 A1* | 11/2012 | Hirata | ............... | B65G 49/061 361/379.01 |
| 2014/0113394 A1 | 4/2014 | Kim | | |
| 2015/0027626 A1* | 1/2015 | Hada | ............... | B29D 11/0073 156/263 |

FOREIGN PATENT DOCUMENTS

| | | |
|---|---|---|
| CN | 203754043 U | 8/2014 |
| JP | 2006-310697 A * | 11/2006 |
| JP | 2011-232383 A * | 11/2011 |
| JP | 2011-243955 | 12/2011 |
| KR | 2001-0003268 | 1/2001 |
| KR | 10-1051822 | 7/2011 |
| KR | 10-1204575 | 11/2012 |
| KR | 10-2014-0049808 | 4/2014 |
| WO | 2011122001 A1 | 10/2011 |

OTHER PUBLICATIONS

Machine Translation of Japanese Patent 2011-232383, Date Unknown.*

* cited by examiner

[Figure 1]
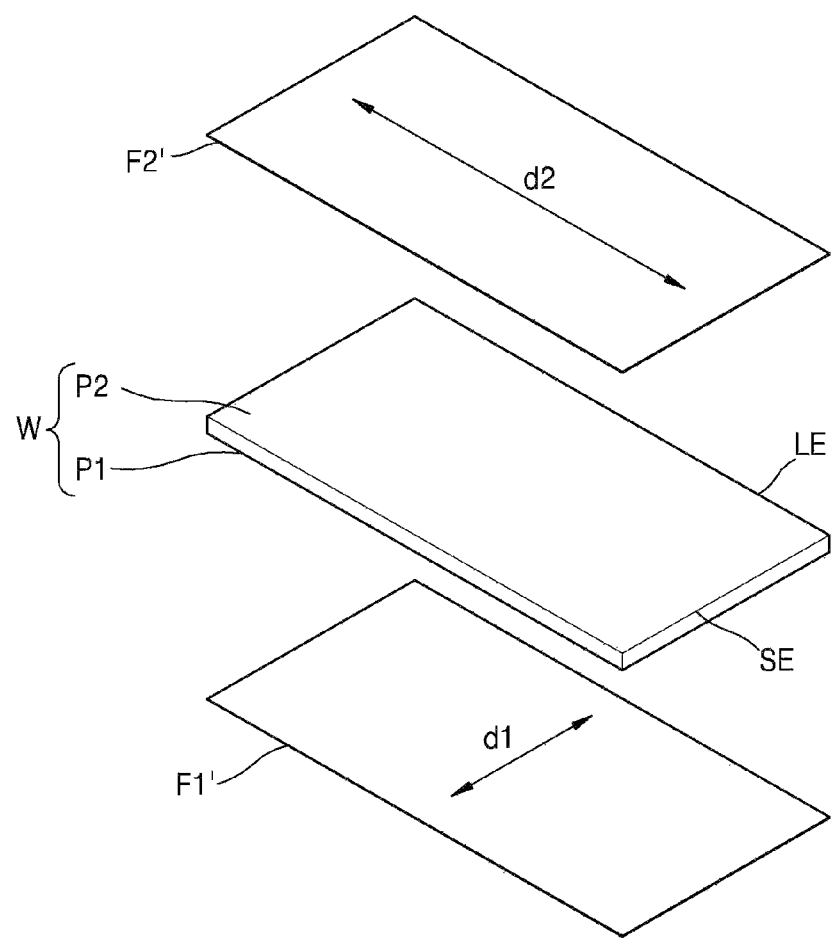

[Figure 2]
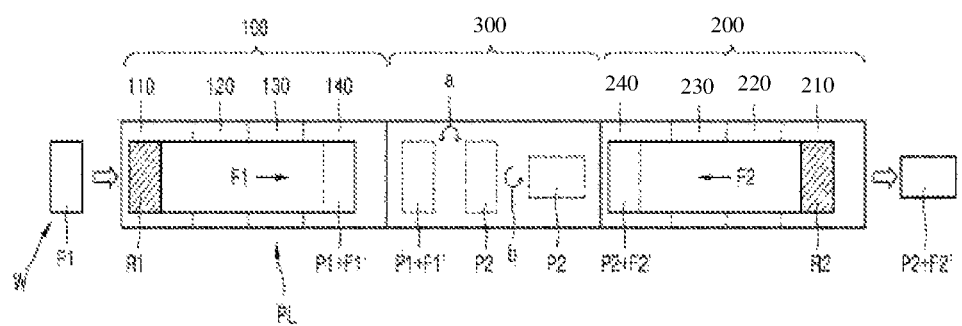

[Figure 3]
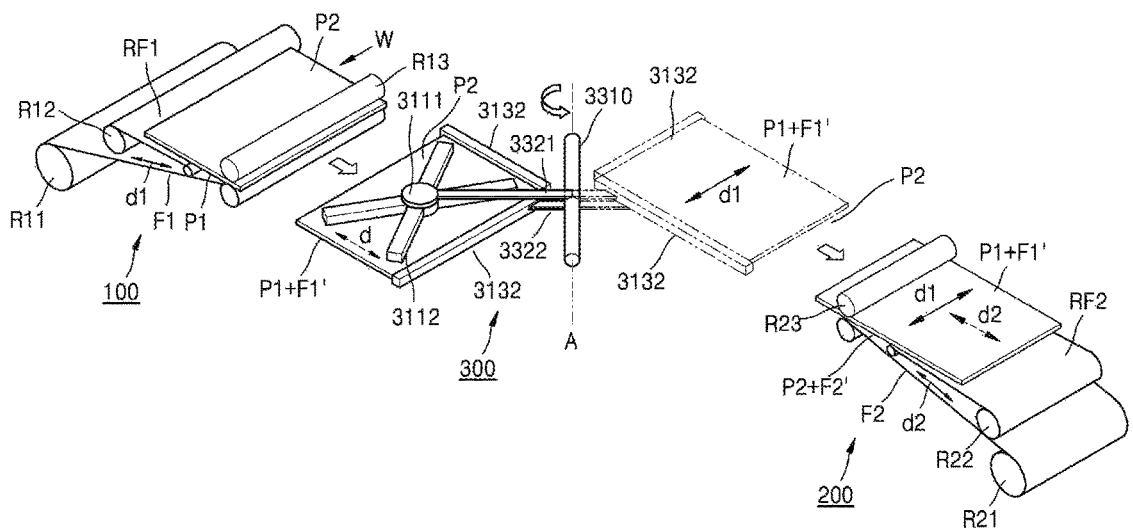

[Figure 4]
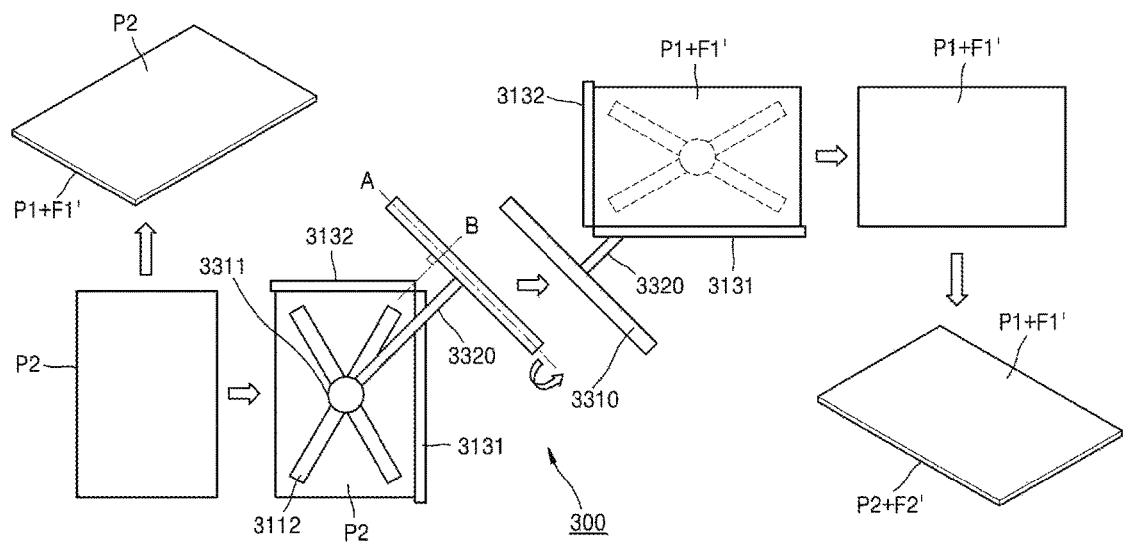

[Figure 5]
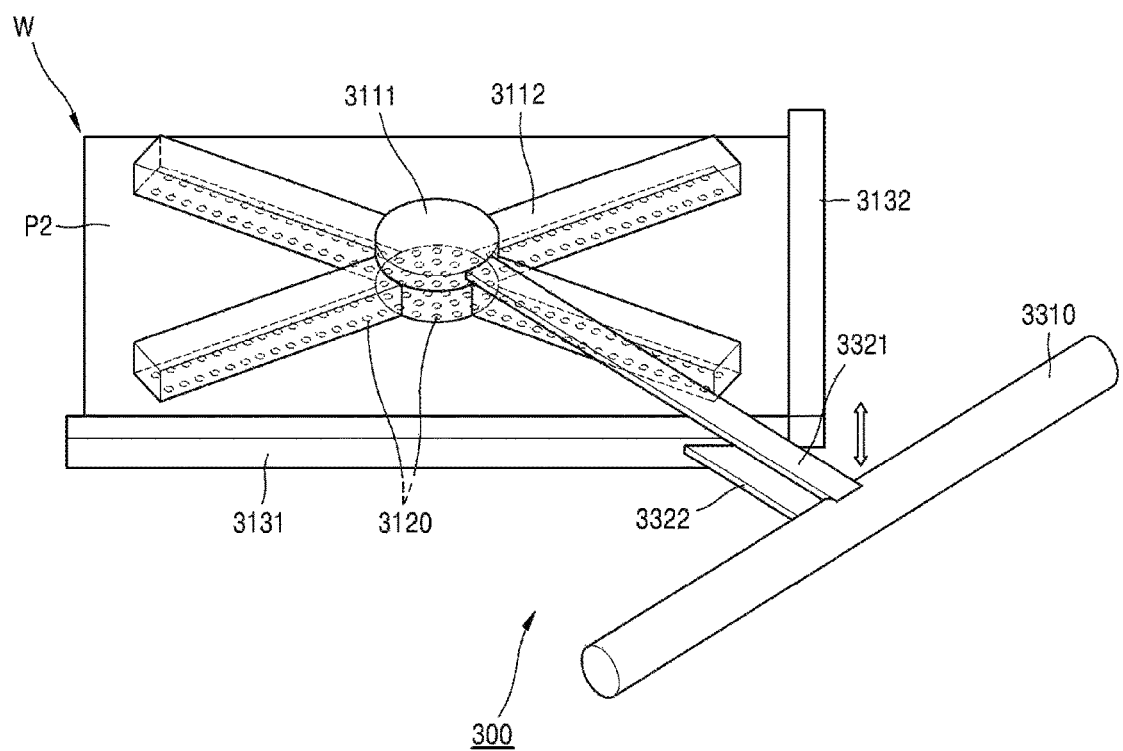

[Figure 6]
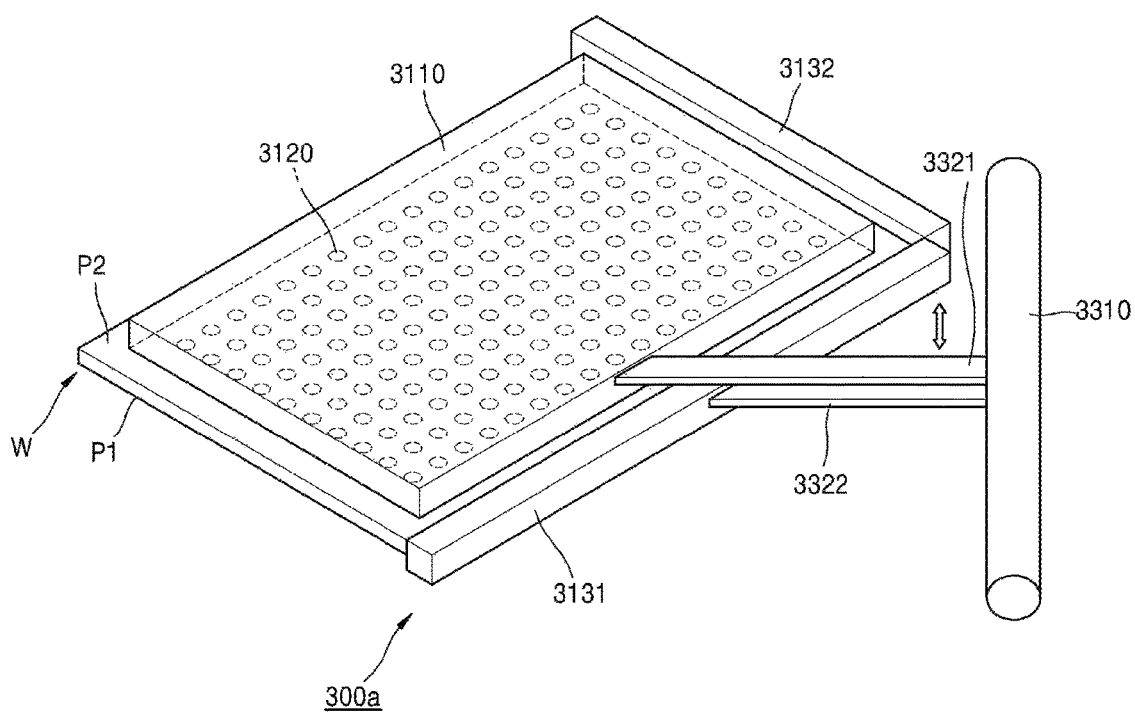

PANEL REVERSING APPARATUS, AND SYSTEM AND METHOD OF MANUFACTURING OPTICAL DISPLAY ELEMENT

This application claims priority to and benefit of KR 10-2016-0076576, filed on Jun. 20, 2016, which is incorporated by reference for all purposes as if fully set forth herein.

TECHNICAL FIELD

The present invention relates to a panel reversing apparatus, and a system and a method of manufacturing an optical display element, and more particularly, to a panel reversing apparatus, and a system and a method for manufacturing an optical display element, which reverse a panel having one surface laminated with an optical film and laminate an optical film on the other surface of the panel.

BACKGROUND ART

In the related art, there is known a system for manufacturing an optical display element including a panel reversing apparatus which when an optical film including a polarizing film is laminated on each of both surfaces of a panel, reverses a position relationship between one surface and the other surface of the panel in a horizontal state.

According to the system for manufacturing the optical display element including the panel reversing apparatus in the related art, an optical film is laminated on one surface of the panel and then the optical film is laminated on the other surface by reversing the panel to allow all of the operations of laminating the optical film on both surfaces of the panel to be performed in a predetermined direction of the panel, thereby achieving an integration of the manufacturing system.

However, the panel reversing apparatus in the related art includes a surface contact means which is in contact with both surfaces of the panel for supporting the panel, so that when the both surface contact means is in contact with or presses one surface of the panel, on which the optical film is laminated, the optical film is transformed or damaged by contact force or pressing force, thereby causing a defect (for example, a scratch of the optical film and a flow of bubble between the optical film and the panel) of the optical display element.

Particularly, when the panel is reversed, a process of making the one surface of the panel, on which the optical film is laminated, face a lower direction of a manufacturing line is accompanied, and during the process, the contact force or the pressing force applied to one surface of the panel, on which the optical film is laminated, is further increased by weight of the panel, and the optical film is more severely transformed or damaged.

DETAILED DESCRIPTION OF THE INVENTION

Technical Problem

The present invention is conceived to solve the aforementioned problem, and an object of the present invention is to provide a panel reversing apparatus, a system for manufacturing an optical display element, and a method of manufacturing an optical display element, which may suppress a transformation or damage of an optical film laminated on a panel when reversing a panel.

Technical Solution

An exemplary embodiment of the present invention provides an apparatus for reversing a panel, the apparatus including: a panel support unit which supports the panel; and a rotating unit which rotates the panel support unit so as to reverse a direction, in which one surface of the panel supported by the panel support unit faces, and a direction, in which the other surface of the panel faces, in which the panel support unit includes a single surface contact unit which is in contact with only one surface between the one surface and the other surface of the panel.

The single surface contact unit may maintain a contact with a contact surface of the panel by vacuum adsorbing force.

The contact surface of the panel, which is in contact with the single surface contact unit, may be a surface between the one surface and the other surface of the panel before an optical film is laminated.

The rotating unit may rotate the panel support unit after a first optical film is laminated on the one surface of the panel and before a second optical film is laminated on the other surface of the panel, and the single surface contact unit may be in contact with the other surface of the panel.

The panel may have a rectangular shape, and the rotating unit may rotate the panel support unit based on a rotation shaft which is not parallel to any one side of the long side and the short side so that a position relationship between the long side and the short side of the panel is reversed.

The single surface contact unit may include a head which is in contact with a center of a contact surface of the panel, and radial arms which are extended in an outwardly radial direction from the head to be in contact with at least a part of the contact surface of the panel.

At least one pair of radial arms which is extended in opposing directions based on the head may be provided.

The pair of radial arms may be positioned in a diagonal line of the contact surface of the panel.

Another exemplary embodiment of the present invention provides a system for manufacturing an optical display element by laminating an optical film on both surfaces of a panel, the system including: a panel reversing apparatus which reverses a panel by supporting the panel, of which an optical film is laminated on one surface, before an optical film is laminated on the other surface of the panel, in which the panel reversing apparatus includes: a panel support unit which includes a single surface contact unit contacting only the other surface of the panel to support the panel; and a rotating unit which rotates the panel support unit so as to reverse a direction, in which one surface of the panel supported by the panel support unit faces, and a direction, in which the other surface of the panel faces.

The optical display element may be manufactured by laminating a sheet piece of a first optical film, which is formed by unwinding the first optical film from a first film roll, around which the elongated first optical film is wound, and cutting the first optical film in a width direction, on the one surface of the panel, and laminating a sheet piece of a second optical film, which is formed by unwinding the second optical film from a second film roll, around which the elongated second optical film having a different width from a width of the first optical film is wound, and cutting the second optical film in a width direction, on the other surface of the panel.

The optical display element may be manufactured by peeling the sheet piece of the first optical film from a first release film by unwinding the first release film from a first film roll, around which the sheet piece of the first optical film is wound while being bonded to the elongated first release film, together with the sheet piece of the first optical film and laminating the sheet piece of the first optical film on one surface of the panel, and peeling the sheet piece of the second optical film from a second release film by unwinding the second release film from a second film roll, around which the sheet piece of the second optical film having a different width from a width of the sheet piece of the first optical film is wound while being bonded to the elongated second release film, together with the sheet piece of the second optical film and laminating the sheet piece of the second optical film on the other surface of the panel.

Still another exemplary embodiment of the present invention provides a method of manufacturing an optical display element by laminating an optical film on both surfaces of a panel, the method including: supporting, by a panel reversing apparatus, a panel, of which an optical film is laminated on one surface, and reversing the panel before an optical film is laminated on the other surface of the panel, in which in the reversing of the panel, the panel is reversed by the panel reversing apparatus which includes a panel support unit including a single surface contact unit contacting only the other surface of the panel to support the panel, and a rotating unit which rotates the panel support unit so as to reverse a direction, in which one surface of the panel supported by the panel support unit faces, and a direction, in which the other surface of the panel faces.

The method may further include: first laminating a sheet piece of a first optical film formed by unwinding the first optical film from a first film roll, around which the elongated first optical film is wound, and cutting the first optical film in a width direction, on one surface of the panel; and second laminating a sheet piece of a second optical film formed by unwinding the second optical film from a second film roll, around which the elongated second optical film having a different width from a width of the first optical film is wound, and cutting the second optical film in a width direction, on the other surface of the panel.

The method may further include: first laminating the sheet piece of the first optical film on one surface of the panel by peeling the sheet piece of the first optical film from a first release film by unwinding the first release film from a first film roll, around which the sheet piece of the first optical film is wound while being bonded to the elongated first release film, together with the sheet piece of the first optical film; and second laminating the sheet piece of the second optical film on the other surface of the panel by peeling the sheet piece of the second optical film from a second release film by unwinding the second release film from a second film roll, around which the sheet piece of the second optical film having a different width from a width of the first optical film is wound while being bonded to the elongated second release film, together with the sheet piece of the second optical film.

Advantageous Effects

According to the panel reversing apparatus, the system for continuously manufacturing the optical display element, and the manufacturing method of the present invention, the single surface contact unit of the panel support unit is in contact with only one surface between the one surface and the other surface of the panel and contacts and supports the panel while the panel reversing apparatus reverses the panel, thereby suppressing a stripe pattern defect inside the optical display element generable when both surfaces of the panel are contacted and supported.

Particularly, the contact surface of the panel which is in contact with the single surface contact unit is the surface between the one surface and the other surface of the panel before the optical film is laminated, so that the surface, on which the optical film is laminated, maintains a non-contact state while the panel is reversed, thereby suppressing a defect (for example, a scratch of the optical film and an inflow of bubbles between the optical film and the panel) of the optical film generable when the surface, on which the optical film is laminated, is contacted and supported.

BRIEF DESCRIPTION OF DRAWINGS

FIG. 1 is a schematic exploded perspective view illustrating an optical display element manufactured by a system for manufacturing an optical display element including a panel reversing apparatus according to an exemplary embodiment of the present invention.

FIG. 2 is a schematic top plan view illustrating an example of a system for manufacturing an optical display element including a panel reversing apparatus according to an exemplary embodiment of the present invention.

FIG. 3 is a schematic perspective view illustrating a part of a line for manufacturing an optical display element including a panel reversing apparatus according to an exemplary embodiment of the present invention.

FIG. 4 is a schematic top plan view illustrating a part of a line for manufacturing an optical display element including a panel reversing apparatus according to an exemplary embodiment of the present invention.

FIG. 5 is a schematic perspective view illustrating a panel reversing apparatus according to an exemplary embodiment of the present invention.

FIG. 6 is a schematic perspective view illustrating a panel reversing apparatus according to another exemplary embodiment of the present invention.

BEST MODE

Hereinafter, the exemplary embodiments of the present invention will be described more fully with reference to the accompanying drawings so that those skilled in the art can easily carry out the present invention. However, the present invention may be implemented in various different forms, and is not limited to the exemplary embodiments described herein. A part irrelevant to the description will be omitted in the drawings to clearly describe the present invention, and the same elements will be designated by the same reference numerals throughout the specification.

As the terms used in the present invention, general terms, which are currently and widely used as possible as they are, in consideration of a function in the present invention, have been selected, but may be changed according to the intentions of those skilled in the art or judicial precedents, appearance of new technology, or the like. Further, in a specific case, there is a term randomly selected by an applicant, and in this case, a meaning of the term will be described in detail in the corresponding description of the invention. Accordingly, the terms used in the present invention shall be defined based on the meaning of the term and the contents throughout the present invention, not the simple name of the term.

Singular expressions used herein include plural expressions unless the singular expressions have definitely opposite meanings in context. Throughout the specification, unless explicitly described to the contrary, the word "comprise" and variations such as "comprises" or "comprising", will be understood to imply the inclusion of stated elements but not the exclusion of any other elements.

Hereinafter, the present invention will be described in detail with reference to the accompanying drawings.

FIG. 1 is a schematic exploded perspective view illustrating an optical display element manufactured by a system for manufacturing an optical display element including a panel reversing apparatus according to an exemplary embodiment of the present invention.

A panel W used in an optical display element manufactured by the present invention is a liquid crystal panel, and may be a glass substrate unit, in which a liquid crystal is positioned between a pair of facing glass substrates P1 and P2. Herein, the panel W may be formed in a rectangular shape, in which a long side LE and a short side SE are approximately orthogonal to each other.

The optical films F1 and F2 used in the optical display element manufactured by the present invention may include a polarizing film. Herein, the optical film laminated on one surface P1 of the panel W will be described as a first optical film F1 and the optical film laminated on the other surface P2 of the panel W will be described as a second optical film F2.

A first polarizing film included in the first optical film F1 and a second polarizing film included in the second optical film F2 may be laminated on the panel W so that an optical pattern direction d1 of the first polarizing film is orthogonal to an optical pattern direction d2 of the second polarizing film with the panel W interposed therebetween. Herein, the "optical pattern direction" means an absorption axis of the polarizing film.

In the present invention, the meaning of "orthogonal" includes a case where the optical pattern direction d1 of the first polarizing film is substantially orthogonal to the optical pattern direction d2 of the second polarizing film, as well as a case where the optical pattern direction d1 of the first polarizing film is mathematically orthogonal to the optical pattern direction d2 of the second polarizing film, and an orthogonal angle is generally 90±2°, preferably, 90±1°, and more preferably, 90±0.5°.

An attachment means may be formed on one surface of each of the optical films F1 and F2 so that the optical films F1 and F2 are laminated on the panel W. The attachment means may be, for example, an adhesive layer, but is not essentially limited thereto. The adhesive layer may use an acryl based adhesive, a silicon based adhesive, a urethane based adhesive, and the like, but is not essentially limited thereto.

The polarizing film may generally include a polarizer and a protective film formed on a single surface or both surfaces of the polarizer by a glue or an adhesive.

Each of the optical films F1 and F2 may further include a phase difference film, a viewing angle compensation film, a brightness improving film, and a surface protecting film thickness.

In the present invention, as the optical films F1 and F2 laminated on the panel W, two types of optical films F1 and F2, which are elongated and have different widths, may be used. Further, the form of optical film substantially laminated on the panel W may be sheet pieces F1' and F2' of the optical film corresponding to the shapes of the one surface P1 and the other surface P2 of the panel W.

In the present invention, the optical films F1 and F2 may form an optical film laminated body together with release films RF1 and RF2 formed on the optical films F1 and F2 through the adhesive layer. The optical film laminated bodies are film rolls R1 and R2 wound in a roll type, and may be used in the system for manufacturing the optical display element according to the exemplary embodiment of the present invention.

The system 1000 for manufacturing the optical display element according to the exemplary embodiment of the present invention is a system for manufacturing an optical display element which manufactures an optical display element by laminating the optical films F1 and F2 on both surfaces P1 and P2 of the panel W, and includes a panel reversing apparatus 300 which supports the panel W (P1+F1'/P2) having one surface P1 on which the optical film F1' is laminated, and reverses the panel W (P1+F1'/P2) before the optical film F2' is laminated on the other surface of the panel W, and the panel reversing apparatus 300 may include a panel support unit 310 including a single surface contact unit 3110 which is in contact with only the other surface P2 of the panel W (P1+F1'/P2) to support the panel W (P1+F1'/P2), and a rotating unit 330 rotating the panel support unit 3110 so as to reverse the direction, in which the one surface P1+F1' of the panel W P1+F1'/P2) supported by the panel support unit 310 faces, and the direction, in which the other surface P2 of the panel W faces. Herein, the optical films F1 and F2 may be laminated on the panel W in the form of the sheet pieces F1' and F2' of the optical film.

FIG. 2 is a schematic top plan view illustrating the system for manufacturing the optical display element including the panel reversing apparatus according to the exemplary embodiment of the present invention, FIG. 3 is a schematic perspective view illustrating a part of a line for manufacturing an optical display element including the panel reversing apparatus according to the exemplary embodiment of the present invention, FIG. 4 is a schematic top plan view illustrating a part of a line for manufacturing an optical display element including the panel reversing apparatus according to the exemplary embodiment of the present invention, and FIG. 5 is a schematic perspective view illustrating the panel reversing apparatus according to the exemplary embodiment of the present invention.

Hereinafter, the system for manufacturing the optical display element, the panel reversing apparatus, and the method of manufacturing the optical display element according to the exemplary embodiment of the present invention will be described in detail with reference to FIGS. 2 to 5.

The system 1000 for manufacturing the optical display element may include a panel carrying line PL carrying the panel W, a first film device 100 laminating the sheet piece (first sheet piece) F1' of the first optical film F1 on the one surface P1 of the panel W, a second film device 200 laminating the sheet piece (second sheet piece) F2' of the second optical film F2, and the panel reversing apparatus 300 reversing the panel W (P1+F1'/P2) on which the first sheet piece F1' is laminated.

The panel carrying line PL is a line which carries the panel W from an upstream side to a downstream side of the manufacturing line during the manufacturing of the optical display element, and a carrying roller or a conveyor belt may be used, but the panel carrying line PL is not essentially limited thereto.

The first film device 100 may include a first film carrying unit 110, a first examining unit 120, a first cutting unit 130, and a first laminating unit 140.

The second film device 200 may include the unit elements similar to the respective unit elements forming the first film device 100. Particularly, the second film device 200 may include a second film carrying unit 210, a second examining unit 220, a second cutting unit 230, and a second laminating unit 240.

The panel reversing apparatus 300 may include the panel support unit 310 and the rotating unit 330.

In the exemplary embodiment of the present invention related to a position, at which the sheet piece of the optical film is laminated, (1) the sheet piece of the optical film is laminated on one surface of the panel in the lower direction of the panel, the panel, on which the sheet piece of the optical film is laminated, is reversed (b) so as to reverse the direction, in which the one surface faces, and the direction, in which the other surface faces, and then the sheet piece of the optical film is laminated on the other surface of the panel in the lower direction of the panel. However, the present invention is not limited thereto, and (2) the sheet piece of the optical film may be laminated on one surface of the panel in the upper direction of the panel, the panel may be reversed (b), and then the sheet piece of the optical film may be laminated on the other surface of the panel in the upper direction of the panel. Herein, the reverse (b) of the panel may be accompanied by turning (a) the panel so that a position relationship between the long side and the short side of the panel is reversed by the panel reversing apparatus 300.

The first film carrying unit 110 may unwind the first optical film F1 together with the first release film RF1 from the first film roll R1 including the first optical film F1, peel off the first optical film F1 from the first release film RF1, and supply the first optical film F1 to the first laminating unit 140.

In the present exemplary embodiment, the first film carrying unit 110 may include a first supply roll R11 and a first winding roll R12. The first supply roll R11 carries the first optical film F1 together with the first release film RF1 while rotating. The first winding roll R12 winds the release film RF1, from which the first optical film F1 is peeled, while rotating.

The first examining unit 120 may examine a defect of the first optical film F1 so that a good area and a defective area may be discriminated in the first optical film F1 unwound from the first film roll R1 by the first film carrying unit 110. Herein, the examination of the defect may examine a defect on the optical film by emitting light to the optical film by using a light source, photographing an image of transmissive light or reflective light emitted from the optical film in the emitted light, and processing the image. For example, a method of detecting a defect through a light and shade determination by binarization processing may be used as the image processing method.

The first cutting unit 130 may form the first sheet pieces F1' by cutting the first optical film F1 unwound from the first film roll R1 by the first film carrying unit 110 by a predetermined interval. Herein, the cutting may be, namely, half-cutting, in which the first optical film F1 is cut without cutting the first release film RF1. In the present exemplary embodiment, the first cutting unit 130 may form the first sheet piece F1' having a length corresponding to the short side SE of the panel W by cutting the good area of the first optical film F1 discriminated by the first examining unit 120 by the predetermined interval. In the present exemplary embodiment, a circular knife blade, a laser device, and the like may be used as the first cutting unit 130.

The first laminating unit 140 may laminate the first optical film F1, which is unwound from the first film roll R1 by the first film carrying unit 110 and peeled off from the first release film RF1, on the one surface P1 of the panel W through the adhesive layer formed on the one surface of the first optical film F1. In the present exemplary embodiment, the first laminating unit 130 may include a first laminating roller R13 and a first driving roller which face each other with the panel W interposed therebetween. Herein, the first optical film F1 may be supplied between the one surface P1 of the panel W and the first laminating roller R13 and the first optical film F1 may be laminated on the one surface P1 of the panel W while the first laminating roller R13 rotates. In the present exemplary embodiment, the first laminating roller R13 may be a member passively driven by the driving of the first driving roller, but is not essentially limited thereto, and the driving of the first laminating roller R13 may have a reverse relation with the passive driving of the first driving roller, and both the first laminating roller R13 and the first driving roller may also be the drivable members. Herein, the first optical film F1 laminated on the one surface P1 of the panel W may be the first sheet piece F1' formed by the first cutting unit 130.

After the first sheet piece F1' is laminated on the one surface P1 of the panel W, the panel reversing apparatus 300 may reverse the panel W so as to reverse the direction, in which the one surface (P1+F1') of the panel W faces, and the direction, in which the other surface P2 of the panel W faces. Accordingly, it is possible to form the first film device 100 and the second film device 200 so that both positions, at which the optical films F1 and F2 are laminated on both surfaces P1 and P2 of the panel W, are the upper portion of the panel or the lower portion of the panel. In the present exemplary embodiment, the panel reversing apparatus 300 may include the panel support unit 310 and the rotating unit 320.

The panel support unit 310 may fix the panel W (P+F1'/P2) having the one surface P1 on which the first optical film F1 is laminated by the first laminating unit 140 while being rotated by the rotating unit 320 to be described below to maintain a stably supported state of the panel W (P+F1'/P2) without separation. In the present exemplary embodiment, the panel support unit 310 may include the single surface contact unit 311, an adsorbing unit 3120, and a support unit 3130.

The single surface contact unit 3110 may be in contact with only one surface between the one surface P1 and the other surface P2 of the panel W to support the panel W. Herein, the contact surface of the panel W which is in contact with the single surface contact unit 3110 may be set to a surface between the one surface P1 and the other surface P2 of the panel W before the optical films F1 and F2 are laminated. In the present exemplary embodiment, the panel W (P1+F1'/P2) having the one surface P1 on which the optical film F1' is laminated, is supplied to the panel reversing apparatus 300 by the first film device 100, so that the single surface contact unit 3110 is in contact with the other surface P2 which has not yet been laminated with the optical film F2'.

Herein, the single surface contact unit 3110 may include a head 3111 which is in contact with a center of the contact surface P2 of the panel W (P1+F1'/P2), and radial arms 3112 which are extended in an outwardly radial direction from the head 3112 and are in contact with at least a part of the contact surface P2 of the panel W (P1+F1'/P2).

The head 3111 is a cylindrical member, and may be in contact with and support the center, at which the center of gravity of the panel W (P1+F1'/P2) is positioned based on a horizontal surface.

At least one pair of radial arms 3112 which is extended in opposing directions based on the head 3110 may be provided. In the present exemplary embodiment, the four radial arms 3112 may be provided while being spaced apart from one another with a predetermined interval in a circumferential direction of the head 3110, and the two pairs of radial arms 3112 extended in opposing directions based on the head 3110 are provided. Further, each of the pair of radial arms 3112 may be positioned in a diagonal line of the contact surface P2 of the panel W (P1+F1'/P2).

Accordingly, the single surface contact unit 3110 may stably distribute and maintain contact force with the panel W (P1+F1'/P2) in the center, at which the center of gravity of the panel W (P1+F1'/P2) is positioned, through the head 3111, and the diagonal line of the contact surface P2 of the panel W (P1+F1'/P2) through the radial arms 3112.

Herein, the single surface contact unit 3110 may maintain the contact with the contact surface P2 of the panel W (P1+F1'/P2) by vacuum adsorbing force of the adsorbing means 3120 which is to be described below.

The adsorbing means 3120 is a suction hole 3120a sucking air between the contact surface P2 of the panel W (P1+F1'/P2) and the single surface contact unit 3110, and may be provided at one side of the single surface contact unit 3110 facing the contact surface P2. Herein, the suction hole 3120a may also be formed in one surface of the single surface contact unit 3110, and may also be formed in a vacuum adsorbing pad (not illustrated) connected to one surface of the single surface contact unit 3110 in a protruding form. The adsorbing means 3120 may include a compressor (not illustrated) which is capable of sucking air through the suction hole 3120a.

The support unit 3130 may support at least a part of the long side LE and the short side SE of the panel W (P1+F1'/P2) when the panel support unit 310 rotates by the rotating unit 330 which is to be described below. Herein, the support unit 3130 may include a long side support arm 3131 supporting the long side LE of the panel W (P1+F1'/P2) and a short side support arm 3132 supporting the short side SE of the panel W (P1+F1'/P2).

The long side support arm 3131 is extended in a longitudinal direction of the long side LE of the panel W (P1+F1'/P2). In the present exemplary embodiment, the long side support arm 3131 is provided to support the long side LE adjacent to a rotation shaft 3310 to be described below between the pair of long sides LE facing each other on the panel W (P1+F1'/P2).

The short side support arm 3132 is extended in a longitudinal direction of the short side SE of the panel W (P1+F1'/P2). In the present exemplary embodiment, the short side support arm 3132 is provided to support the short side SE adjacent to the rotation shaft 3310 to be described below between the pair of short sides SE facing each other on the panel W (P1+F1'/P2).

Accordingly, it is possible to simultaneously support one long side LE and one short side SE which are adjacent to each other on the panel W (P1+F1'/P2) by the long side support arm 3131 and the short side support arm 3132 at the same time, and it is possible to distribute weight of the panel W (P1+F1'/P2) to the long side support arm 3131 and the short side support arm 3132 while the panel support unit 310 rotates and the panel W (P1+F1'/P2) is inclined from a horizontal state.

The rotating unit 330 may rotate the panel support unit 310 so as to reverse the direction, in which the one surface P1 of the panel W (P1+F1') supported by the panel support unit 310 faces, and the direction, in which the other surface P2 of the panel W (P1+F1') supported by the panel support unit 310 faces. Herein, the rotating unit 330 may rotate the panel support unit 310 after the first optical film F1 is laminated on the one surface P1 of the panel W and before the second optical film F2 is laminated on the other surface P2 of the panel W. Herein, the rotating unit 330 may include the rotation shaft 3310 and a connecting unit 3320.

The rotation shaft 3310 may be connected and fixed to the panel support unit 310 by the connecting unit 3320 to be described below to rotate based on a virtual first axis A. Herein, the virtual first axis A may not be parallel to any one of the long side LE and the short side SE of the panel W (P1+F1', P2) so that a position relationship between the long side LE and the short side SE of the panel W (P1+F1', P2) is reversed while the rotation shaft 3310 rotates and the direction, in which the one surface P1 of the panel W (P1+F1', P2) faces, and the direction in which the other surface P2 of the panel W (P1+F1', P2) faces, are reversed. The virtual first axis A may be, for example, an axis perpendicular to a line B which bisects an angle (right angle) between the long side support arm 3131 and the short side support arm 3132. Further, the virtual first axis A may be parallel to a surface of the panel P.

Herein, the rotating unit 330 may include a rotation position detecting sensor (not illustrated) disposed in the rotation shaft 3310, a servo motor (not illustrated) driving the rotation shaft 3310, a decelerator (not illustrated) mechanically connecting the servo motor and the rotation shaft 3310, and a coupling (not illustrated). Accordingly, the servo motor and the decelerator are appropriately controlled based on a detection signal of the rotation position detection sensor 26 disposed in the rotation shaft 3310, thereby rotating the rotation shaft 21 based on a desired rotating angle, rotating speed, rotating direction, and timing.

The connecting unit 3320 may mechanically connect and fix the rotation shaft 3310 and the panel support unit 310 while the rotation shaft 3310 rotates. Herein, the connecting unit 3320 may include a first connection arm 3321 and a second connection arm 3322.

The first connection arm 3321 may connect the single surface contact unit 3110 and the rotation shaft 3310. Herein, the first connection arm 3321 may be a member connecting the head 3111 and the rotation shaft 3310. Further, one end of the first connection arm 3321 adjacent to the rotation shaft 3310 is connected so as to vertically reciprocate in a longitudinal direction of a vertical axis (not illustrate) vertically extended with respect to the rotation shaft 3310, so that the single surface contact unit 3110 may reciprocate between a contact position, at which the single surface contact unit 3110 is in contact with the other surface P2 of the panel W (P1+F1', P2), and a release position, at which the contact is released.

For example, when the panel W (P1+F1'/P2) having the one surface P1 on which the first optical film F1 is laminated by the first film device 100, is carried into the panel reversing apparatus 300, the single surface contact unit 3110 is positioned at the release position, and when the long side LE and the short side SE of the panel W (P1+F1'/P2) are in contact with the long side support arm 3131 and the short side support arm 3132, respectively, the single surface contact unit 3110 may shift to the contact position by the shift of the first connection arm 3321. Further, when the position relationship between the one surface (P1+F1') and the other surface P2 of the panel W (P1+F1', P2) is reversed by the rotation of the rotation shaft 3310, the single surface contact unit 3110 shifts to the release position by the shift of the first connection arm 3321, so that the reversed panel W (P1+F1'/P2) may be carried out to the second film device 200.

The second connection arm 3320 may connect the support unit 3130 and the rotation shaft 3310. Herein, the second connection arm 3322 may be a member connecting the long side support arm 3131 and the rotation shaft 3310.

The first connection arm 3310 and the second connection arm 3320 may be parallel to the line B which bisects the angle (right angle) between the long side support arm 3131 and the short side support arm 3132. Accordingly, the first connection arm 3310 and the second connection arm 3320 may be perpendicular to a center axis A1 of the rotation shaft 3310.

The system 1000 for manufacturing the optical display element may include the second film device 200 which laminates the sheet piece (second sheet piece) F2' of the second polarizing film F2 on the other surface P2 of the panel W as described above. The second film device 200 may include the respective unit elements described in the first film device 100. For example, the second film carrying unit 210 may be formed of devices (a second supply roll R21 and a second winding roll R22) similar to the configuration (the first supply roll R11 and the first winding roll R12) of the first film carrying unit 110, the second examining unit 220 may be formed of a device similar to the configuration of the first examining unit 120, the second cutting unit 230 may be formed of a device similar to the configuration of the first cutting unit 130, and the second laminating unit 240 may be formed of devices (a second laminating roller R23 and a second driving roller) similar to the configuration (the first laminating roller R13 and the first driving roller) of the first laminating unit 140.

Herein, the optical film, the release film, and the film roll used in the second film device 200 may be the second optical film F2, the second release film RF2, and the second film roll R2 having the width corresponding to the short side SE of the panel W.

The system 1000 for continuously manufacturing the optical display element may include an optical display element carrying unit (not illustrated) which is capable of carrying the optical display element, of which the second sheet piece F2' is laminated on the other surface P2' of the panel W by the second laminating unit 200, to the downstream side of the manufacturing line. Herein, a carrying roller or a conveyor belt may be used as the optical display element carrying unit (not illustrated).

The system 1000 for continuously manufacturing the optical display element may include an examining unit for examining the optical display element. Herein, an examination object and an examination method of the examining unit are not particularly limited.

A method of manufacturing an optical display element according to an exemplary embodiment of the present invention is a method of manufacturing an optical display element by laminating an optical film on both surfaces of a panel, and includes a panel reversing operation of reversing a panel W (P1+F1'/P2) before an optical film F2' is laminated on the other surface P2 of the panel W (P1+F1'/P2) by supporting the panel W (P1+F1'/P2), of which an optical film F1' is laminated on one surface P1 through a panel reversing apparatus 300, and in the panel reversing operation, the panel may be reversed by the panel reversing apparatus 300 which includes: a panel support unit 310 including a single surface contact unit 3110 which is in contact with only the other surface P2 of the panel W (P1+F1'/P2) to support the panel W (P1+F1'/P2); and a rotating unit 330 rotating the panel support unit 310 so that a direction, in which the one surface (P1+F1') of the panel W (P1+F1'/P2) supported by the panel support unit 310 faces, and a direction, in which the other surface P2 of the panel W (P1+F1'/P2) supported by the panel support unit 310 faces, are reversed.

Herein, the method of manufacturing the optical display element according to the exemplary embodiment may include: a first laminating operation of laminating a sheet piece (first sheet piece) F1' of a first optical film F1, which is formed by unwinding the first optical film F1 from a first film roll R1, around which the elongated first optical film F1 is wound, and cutting the first optical film F1 in a width direction, on the one surface P1 of the panel W; and a second laminating operation of laminating a sheet piece (second sheet piece) F2' of a second optical film F2, which is formed by unwinding the second optical film F2 from a second film roll R2, around which the elongated second optical film F2 having a different width from that of the first optical film F1 is wound, and cutting the second optical film F2 in a width direction, on the other surface P2 of the panel W.

Herein, a method of manufacturing an optical display element according to another embodiment may include: a first laminating operation of peeling the sheet piece (first sheet piece) F1' of the first optical film F1 from the first release film RF1 by unwinding the first release film RF1 from the first film roll R1, around which the sheet piece (first sheet piece) F1' of the first optical film F1 is wound while being bonded to the elongated first release film RF1, together with the sheet piece (first sheet piece) F1' of the first optical film F1 and laminating the sheet piece (first sheet piece) F1' of the first optical film F1 on one surface P1 of the panel W; and a second laminating operation of peeling the sheet piece (second sheet piece) F2' of the second optical film F2 from the second release film RF2 by unwinding the second release film RF2 from the second film roll R2, around which the sheet piece (second sheet piece) F2' of the second optical film F2 having a different width from that of the first optical film F1 is wound while being bonded to the elongated second release film RF2, together with the sheet piece (second sheet piece) F2' of the second optical film F2 and laminating the sheet piece (second sheet piece) F2' of the second optical film F2 on the other surface P2 of the panel W.

According to the panel reversing apparatus 300, the system 1000 for continuously manufacturing the optical display element, and the manufacturing method of the present invention, the single surface contact unit 3110 of the panel support unit 310 is in contact with only one surface between the one surface P1 and the other surface P2 of the panel W and contacts and supports the panel W while the panel reversing apparatus 300 reverses the panel W, thereby suppressing a stripe pattern defect inside the optical display element generable when both surfaces P1 and P2 of the panel W are contacted and supported.

Particularly, the contact surface of the panel W (P1+F1'/P2) which is in contact with the single surface contact unit 310 is the surface P2 between the one surface (P1+F1') and the other surface P2 of the panel W (P1+F1'/P2) before the optical film F2' is laminated, so that the surface (P1+F1'), on which the optical film F1' is laminated, maintains a non-contact state while the panel W (P1+F1'/P2) is reversed, thereby suppressing a defect (for example, a scratch of the optical film F1' and an inflow of bubbles between the optical film F1' and the panel W) of the optical film F1' generable when the surface (P1+F1'), on which the optical film F1' is laminated, is contacted and supported.

In the meantime, FIG. 6 is a schematic perspective view illustrating a panel reversing apparatus 300a according to another exemplary embodiment of the present invention. A configuration and an effect of the panel reversing apparatus 300a according to another exemplary embodiment are mostly the same as those of the panel reversing apparatus 300 according to the exemplary embodiment, so that a description thereof will be omitted, and only a difference between the panel reversing apparatus 300a and the panel reversing apparatus 300 will be described.

Similar to the panel reversing apparatus 300 according to the exemplary embodiment illustrated in FIG. 5, a single surface contact unit 3110 may include a head 3111 which is in contact with a center of the contact surface P2 of the panel W (P1+F1'/P2), and radial arms 3112 which are extended in an outwardly radial direction from the head 3112 and are in contact with at least a part of the contact surface P2 of the panel W (P1+F1'/P2), but like the panel reversing apparatus 300a according to the exemplary embodiment illustrated in FIG. 6, the single surface contact unit 3110 may include an approximately rectangular board 3110.

Further, in the panel reversing apparatus 300a according to the exemplary embodiment, adsorbing holes 3120a as an adsorbing means 3120 may be evenly disposed on an entire surface of one side of the single surface contact unit 3110 facing the one surface P1 of the panel W. Accordingly, it is possible to decrease suction force sucking air per adsorbing hole 3120a for preventing the panel W from being separated.

The single surface contact unit 3110 in the exemplary embodiment of the present invention includes the head and the radial arms, and the single surface contact unit 3110 in another exemplary embodiment of the present invention includes the approximately rectangular board, but it is a matter of course that the plurality of contact arms elongated in the longitudinal direction of any one side of the long side and the short side of the panel may be provided to be arranged in the longitudinal direction of the other side.

The above description of the present invention is illustrative, and those skilled in the art to which the present invention pertains may understand that modifications to other particular forms may be easily made without changing the technical spirit or the essential feature of the present invention. Thus, it is to be appreciated that the embodiments described above are intended to be illustrative in every sense, and not restrictive. For example, each constituent element described in a singular form may be distributed and carried out, and similarly, constituent elements described in a distributed form may be carried out in a combination form.

The scope of the present invention is represented by the claims to be described below rather than the detailed description, and it is to be interpreted that the meaning and scope of the claims and all the changes or modified forms derived from the equivalents thereof come within the scope of the present invention.

What is claimed is:

1. A method of manufacturing an optical display element by laminating an optical film on both surfaces of a panel, the method comprising:
   supporting, by a panel reversing apparatus, a panel, of which an optical film is laminated on one surface, and reversing the panel before an optical film is laminated on the other surface of the panel,
   wherein in the reversing of the panel, the panel is reversed by the panel reversing apparatus which includes a panel support unit including a single surface contact unit contacting only the other surface of the panel to support the panel, and a rotating unit which rotates the panel support unit so as to reverse a direction, in which one surface of the panel supported by the panel support unit faces, and a direction, in which the other surface of the panel faces,
   wherein the panel support unit further comprises an absorbing means comprising a plurality of suction holes,
   wherein the single surface contact unit includes a head which is in contact with a center of a contact surface of the panel, and at least one pair of radial arms extending in an outwardly radial direction from the head to be in contact with at least a part of the contact surface of the panel and positioned in a diagonal line of the contact surface of the panel, and
   wherein the plurality of suction holes are arranged in the head and radial arms of the single surface contact unit.

2. The method of claim 1, further comprising:
   first laminating a sheet piece of a first optical film formed by unwinding the first optical film from a first film roll, around which the elongated first optical film is wound, and cutting the first optical film in a width direction, on one surface of the panel; and
   second laminating a sheet piece of a second optical film formed by unwinding the second optical film from a second film roll, around which the elongated second optical film having a different width from a width of the first optical film is wound, and cutting the second optical film in a width direction, on the other surface of the panel.

3. The method of claim 1, further comprising:
   first laminating a sheet piece of a first optical film on one surface of the panel by peeling a sheet piece of a first optical film from a first release film by unwinding the first release film from a first film roll, around which the sheet piece of the first optical film is wound while being bonded to the elongated first release film, together with the sheet piece of the first optical film; and
   second laminating a sheet piece of a second optical film on the other surface of the panel by peeling a sheet piece of a second optical film from a second release film by unwinding the second release film from a second film roll, around which the sheet piece of the second optical film having a different width from a width of the first optical film is wound while being bonded to the elongated second release film, together with the sheet piece of the second optical film.

4. An apparatus for reversing a panel, the apparatus comprising:
   a panel support unit which supports the panel;
   a rotating unit which rotates the panel support unit so as to reverse a direction, in which one surface of the panel supported by the panel support unit faces, and a direction, in which the other surface of the panel faces; and
   an absorbing means comprising a plurality of suction holes,
   wherein the panel support unit includes a single surface contact unit which is in contact with only one surface between the one surface and the other surface of the panel,
   wherein the single surface contact unit includes a head which is in contact with a center of a contact surface of the panel, and at least one pair of radial arms extending in an outwardly radial direction from the head to be in contact with at least a part of the contact surface of the panel and positioned in a diagonal line of the contact surface of the panel, and wherein the plurality of suction holes are arranged in the head and radial arms of the single surface contact unit.

5. The apparatus of claim 4, wherein the single surface contact unit maintains a contact with a contact surface of the panel through the absorbing means by vacuum adsorbing force.

6. The apparatus of claim 4, wherein the contact surface of the panel, which is in contact with the single surface contact unit, is a surface between the one surface and the other surface of the panel before an optical film is laminated.

7. The apparatus of claim 6, wherein the rotating unit rotates the panel support unit after a first optical film is laminated on the one surface of the panel and before a second optical film is laminated on the other surface of the panel, and the single surface contact unit is in contact with the other surface of the panel.

8. The apparatus of claim 4, wherein the panel has a rectangular shape, and
the rotating unit rotates the panel support unit based on a rotation shaft which is not parallel to any one side of the long side and the short side so that a position relationship between the long side and the short side of the panel is reversed.

9. A system for manufacturing an optical display element by laminating an optical film on both surfaces of a panel, the system comprising:
a panel reversing apparatus which reverses a panel by supporting the panel, of which an optical film is laminated on one surface, before an optical film is laminated on the other surface of the panel,
wherein the panel reversing apparatus includes:
a panel support unit which includes a single surface contact unit contacting only the other surface of the panel to support the panel;
a rotating unit which rotates the panel support unit so as to reverse a direction, in which one surface of the panel supported by the panel support unit faces, and a direction, in which the other surface of the panel faces; and
an absorbing means comprising a plurality of suction holes,
wherein the single surface contact unit includes a head which is in contact with a center of a contact surface of the panel, and at least one pair of radial arms extending in an outwardly radial direction from the head to be in contact with at least a part of the contact surface of the panel and positioned in a diagonal line of the contact surface of the panel, and
wherein the plurality of suction holes are arranged in the head and radial arms of the single surface contact unit.

10. The system of claim 9, wherein the optical display element is manufactured by laminating a sheet piece of a first optical film, which is formed by unwinding the first optical film from a first film roll, around which the elongated first optical film is wound, and cutting the first optical film in a width direction, on the one surface of the panel, and laminating a sheet piece of a second optical film, which is formed by unwinding the second optical film from a second film roll, around which the elongated second optical film having a different width from a width of the first optical film is wound, and cutting the second optical film in a width direction, on the other surface of the panel.

11. The system of claim 9, wherein the optical display element is manufactured by peeling a sheet piece of a first optical film from a first release film by unwinding the first release film from a first film roll, around which the sheet piece of the first optical film is wound while being bonded to the elongated first release film, together with the sheet piece of the first optical film and laminating the sheet piece of the first optical film on one surface of the panel, and peeling a sheet piece of a second optical film from a second release film by unwinding the second release film from a second film roll, around which the sheet piece of the second optical film having a different width from a width of the sheet piece of the first optical film is wound while being bonded to the elongated second release film, together with the sheet piece of the second optical film and laminating the sheet piece of the second optical film on the other surface of the panel.

12. A system for manufacturing an optical display element by laminating an optical film on both surfaces of a panel, the system comprising:
a first film device which laminates a sheet piece of a first optical film formed by unwinding the first optical film from a first film roll, around which the elongated first optical film is wound, and cutting the first optical film in a width direction, on one surface of the panel;
a second film device which laminates a sheet piece of a second optical film formed by unwinding the second optical film from a second film roll, around which the elongated second optical film having a different width from a width of the first optical film is wound, and cutting the second optical film in a width direction, on the other surface of the panel; and
a panel reversing apparatus which reverses a panel by supporting the panel having the one surface on which the sheet piece of the first optical film is laminated, before the sheet piece of the second optical film is laminated on the other surface of the panel,
wherein the panel reversing apparatus includes:
a panel support unit which includes a single surface contact unit which is in contact with only the other surface of the panel to support the panel;
a rotating unit which rotates the panel support unit so as to reverse a direction, in which one surface of the panel supported by the panel support unit faces, and a direction, in which the other surface of the panel faces; and
an absorbing means comprising a plurality of suction holes,
wherein the single surface contact unit includes a head which is in contact with a center of a contact surface of the panel, and at least one pair of radial arms extending in an outwardly radial direction from the head to be in contact with at least a part of the contact surface of the panel and positioned in a diagonal line of the contact surface of the panel, and
wherein the plurality of suction holes are arranged in the head and radial arms of the single surface contact unit.

* * * * *